US011239776B2

United States Patent
Li et al.

(10) Patent No.: US 11,239,776 B2
(45) Date of Patent: Feb. 1, 2022

(54) MOTOR CONTROLLER HAVING LOW STANDBY POWER CONSUMPTION

(71) Applicant: Regal Beloit America, Inc., Beloit, WI (US)

(72) Inventors: Ming Li, Fort Wayne, IN (US); Roger Carlos Becerra, Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 38 days.

(21) Appl. No.: 16/272,613

(22) Filed: Feb. 11, 2019

(65) Prior Publication Data

US 2020/0259434 A1    Aug. 13, 2020

(51) Int. Cl.
*H02P 8/12* (2006.01)
*H02P 29/40* (2016.01)
*H02J 9/06* (2006.01)
*B60W 10/06* (2006.01)

(52) U.S. Cl.
CPC ............. *H02P 8/12* (2013.01); *B60W 10/06* (2013.01); *H02J 9/06* (2013.01); *H02P 29/40* (2016.02)

(58) Field of Classification Search
CPC . H02P 8/12; H02P 29/40; B60W 10/06; H02J 9/06
USPC ........................................................ 318/635
See application file for complete search history.

(56) References Cited

U.S. PATENT DOCUMENTS

| | | | |
|---|---|---|---|
| 6,043,950 A * | 3/2000 | Kim ...................... | G11B 19/20 360/73.03 |
| 6,097,107 A * | 8/2000 | Ikeda ................... | B60H 1/3225 307/10.7 |
| 6,097,679 A * | 8/2000 | Ohtaki .................. | G11B 19/02 369/47.11 |
| 6,232,758 B1 * | 5/2001 | Konda ................. | H03K 17/302 323/351 |
| 6,414,864 B1 * | 7/2002 | Hoshi ...................... | G05F 1/10 363/69 |
| 8,996,892 B1 * | 3/2015 | Chu ........................ | G06F 1/325 713/300 |
| 9,548,652 B2 | 1/2017 | Cao et al. | |
| 9,716,447 B2 * | 7/2017 | Ortiz ......................... | H02P 3/14 |
| 10,178,720 B1 * | 1/2019 | Xiong .................... | H05B 47/11 |
| 2004/0052092 A1 * | 3/2004 | Hirosawa .......... | H02M 3/33507 363/13 |
| 2004/0156163 A1 | 8/2004 | Nerheim | |

(Continued)

OTHER PUBLICATIONS

US 10,027,222 B2, 07/2018, Yao et al. (withdrawn)

*Primary Examiner* — Kawing Chan
(74) *Attorney, Agent, or Firm* — Armstrong Teasdale LLP

(57) ABSTRACT

A motor controller having low standby power consumption is provided. The motor controller includes a direct current (DC) bus. The motor controller also includes a low-power supply. The motor controller also includes an inverter configured to control a supply of current to stator windings of a motor. The motor controller also includes a switch circuit coupled between the DC bus and the low-power supply. The motor controller also includes a switch controller coupled to the switch circuit and configured to be coupled to a system controller. The switch controller is configured to control the switch circuit to electrically decouple, in response to detecting an absence of a control signal from the system controller, the DC bus from the low-power supply.

17 Claims, 11 Drawing Sheets

(56) References Cited

U.S. PATENT DOCUMENTS

| | | | |
|---|---|---|---|
| 2005/0041360 A1* | 2/2005 | Dettweiler | H02J 9/005 361/160 |
| 2006/0125436 A1* | 6/2006 | Lin | H02P 7/29 318/376 |
| 2007/0164718 A1* | 7/2007 | Nishi | H02M 3/158 323/284 |
| 2008/0136765 A1 | 6/2008 | Neugebauer | |
| 2008/0284459 A1 | 11/2008 | Gattiker et al. | |
| 2010/0202161 A1* | 8/2010 | Sims | H02M 7/02 363/20 |
| 2012/0151162 A1* | 6/2012 | Trantham | G06F 1/30 711/161 |
| 2013/0067259 A1* | 3/2013 | Freiwald | G06F 1/3293 713/323 |
| 2013/0121033 A1 | 5/2013 | Lehn et al. | |
| 2013/0241451 A1* | 9/2013 | Wei | H02J 9/005 318/400.3 |
| 2014/0008984 A1* | 1/2014 | Kamiyama | H02J 9/06 307/64 |
| 2014/0184285 A1* | 7/2014 | Dunipace | H02M 1/36 327/143 |
| 2014/0204638 A1 | 7/2014 | Jung | |
| 2014/0258738 A1* | 9/2014 | Greenwalt | G06F 1/3206 713/300 |
| 2014/0312691 A1* | 10/2014 | Doljack | H02J 2207/40 307/29 |
| 2015/0162840 A1 | 6/2015 | Frost et al. | |
| 2015/0207437 A1* | 7/2015 | Nagler | H02P 3/14 318/139 |
| 2015/0207440 A1* | 7/2015 | Lian | H02P 6/12 318/400.26 |
| 2015/0237228 A1* | 8/2015 | Okuzono | G06K 15/406 358/1.13 |
| 2016/0105092 A1* | 4/2016 | Takakura | B60L 50/51 318/519 |
| 2016/0185237 A1* | 6/2016 | Ha | B60L 58/20 318/139 |
| 2017/0123485 A1* | 5/2017 | Imata | G06F 1/3296 |
| 2017/0271904 A1* | 9/2017 | Ziv | H05B 39/041 |
| 2017/0331400 A1* | 11/2017 | Saha | H02P 27/06 |
| 2018/0281605 A1* | 10/2018 | Sawazaki | H01L 23/4012 |
| 2018/0334044 A1* | 11/2018 | Jang | B60L 58/20 |
| 2018/0358889 A1* | 12/2018 | Moriyama | H02M 1/32 |
| 2019/0193589 A1* | 6/2019 | Toriumi | H01H 47/002 |

* cited by examiner

MOTOR CONTROLLER HAVING LOW STANDBY POWER CONSUMPTION

BACKGROUND

The field of the invention relates generally to electric motor controllers, and, more particularly, to a motor controller having low standby power consumption.

Motor controllers include many components such as a rectifier, capacitors, inverters, and low power electronics. In standby mode, a motor remains connected to a source of power such as an alternating current (AC) line, and some components are powered, but the windings are not energized. In at least some known motors, all components of the motor controller remain powered while the motor is in standby mode. This results in excess power consumption and decreases the energy efficiency of the motor. It is therefore desirable to have a motor controller capable of reducing standby power consumption.

BRIEF DESCRIPTION

In one aspect, a motor controller is provided. The motor controller includes a direct current (DC) bus and a low-power supply. The motor controller also includes an inverter configured to control a supply of current to stator windings of a motor and a switch circuit coupled between the DC bus and the low-power supply. The motor controller further includes a switch controller coupled to the switch circuit and configured to be coupled to a system controller. The switch controller is configured to control the switch circuit to electrically decouple, in response to detecting an absence of a control signal from the system controller, the DC bus from the low-power supply.

In another aspect, a method for operating a motor controller for a motor is provided. The method includes detecting, by a switch controller, an absence of a control signal from a system controller. The method also includes decoupling, by a switch circuit, a low-power supply of the motor controller from a DC bus of the motor controller in response to detecting the absence of the control signal. The method further includes detecting, by the switch controller, the control signal. The method also includes coupling, by the switch circuit, the low-power supply to the DC bus in response to detecting the control signal.

In another aspect, a motor is provided. The motor includes a plurality of stator windings and a motor controller configured to control a supply of current to the stator windings. The motor controller includes a DC bus and a low-power supply, the low-power supply configured to power control electronics of the motor. The motor controller is configured to electrically decouple said DC bus from said low-power supply in response to detecting an absence of a control signal from a system controller.

DETAILED DESCRIPTION

The embodiments described herein provide a motor controller with low standby power consumption. More specifically, the motor controllers described herein include a switch circuit, or switch component, that is configured to electrically decouple, or disconnect, a portion of the motor controller from power when the motor controller is in standby mode. By electrically decoupling the portion of the motor controller, components of the decoupled portion no longer consumes power in standby mode. The decoupled portion of the motor controller may include, for example, a low-power supply, a processor such as a digital signal processor (DSP), an inverter, and/or a direct current (DC) link capacitor. The switch circuit electrically decouples the portion when the motor controller detects an absence of a system control signal, such as a signal that controls the operation of a motor coupled to the motor controller. The switch circuit electronically couples the portion when the motor detects the presence of the control signal.

Figure 1:
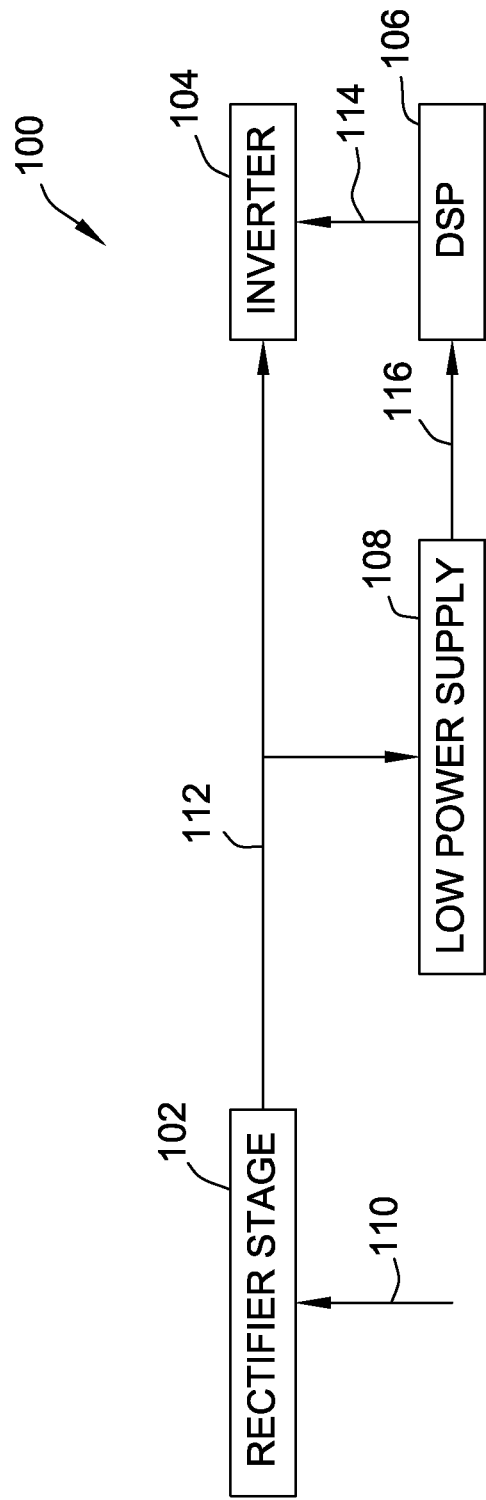
FIG. 1 is a block diagram of an exemplary motor controller.

FIG. 1 is a block diagram of an exemplary motor controller 100. Motor controller 100 includes a rectifier stage 102, an inverter 104, a digital signal processor (DSP) 106, a low-power supply 108, an alternating current (AC) bus 110 and a direct current (DC) bus 112.

Rectifier stage 102 converts an alternating current (AC) line signal on AC bus 110 to DC power on DC bus 112 that may be used to power the various components of motor controller 100. Rectifier stage 102 may include, for example, one or more of a rectifier, a lighting protection circuit, and an electromagnetic interference (EMI) filter. Rectifier stage 102 may be coupled to DC bus 112, through which DC power can be provided to other components of motor controller 100 such as inverter 104 and low-power supply 108.

Inverter 104 is coupled to DC bus 112 and converts DC power to a signal for supplying current to stator windings of a motor (not shown). Inverter 104 may include a plurality of switches controlled by one or more control signals 114 generated by DSP 106. In certain embodiments, inverter 104 is electrically decoupled from DC bus 112 while motor controller 100 is in standby mode. Thus, inverter 104 does not consume power while motor controller 100 is in standby mode.

DSP 106 is coupled to inverter 104 and generates control signal 114 to control inverter 104. DSP 106 is powered by a low-power signal 116 provided by low-power supply 108 that is powered by DC bus 112.

Low-power supply 108 powers control electronics such as DSP 106. Control electronics may include, for example, components such as microcontroller circuits, gate drive circuits, and sensing circuits. In certain embodiments, low-power supply 108 is electrically decoupled from DC bus 112 while motor controller 100 is in standby mode. Thus, DSP 106 does not receive power from low-power supply 108 and neither low-power supply 108 nor DSP 106 consumes power while motor controller 100 is in standby mode.

Figure 2:
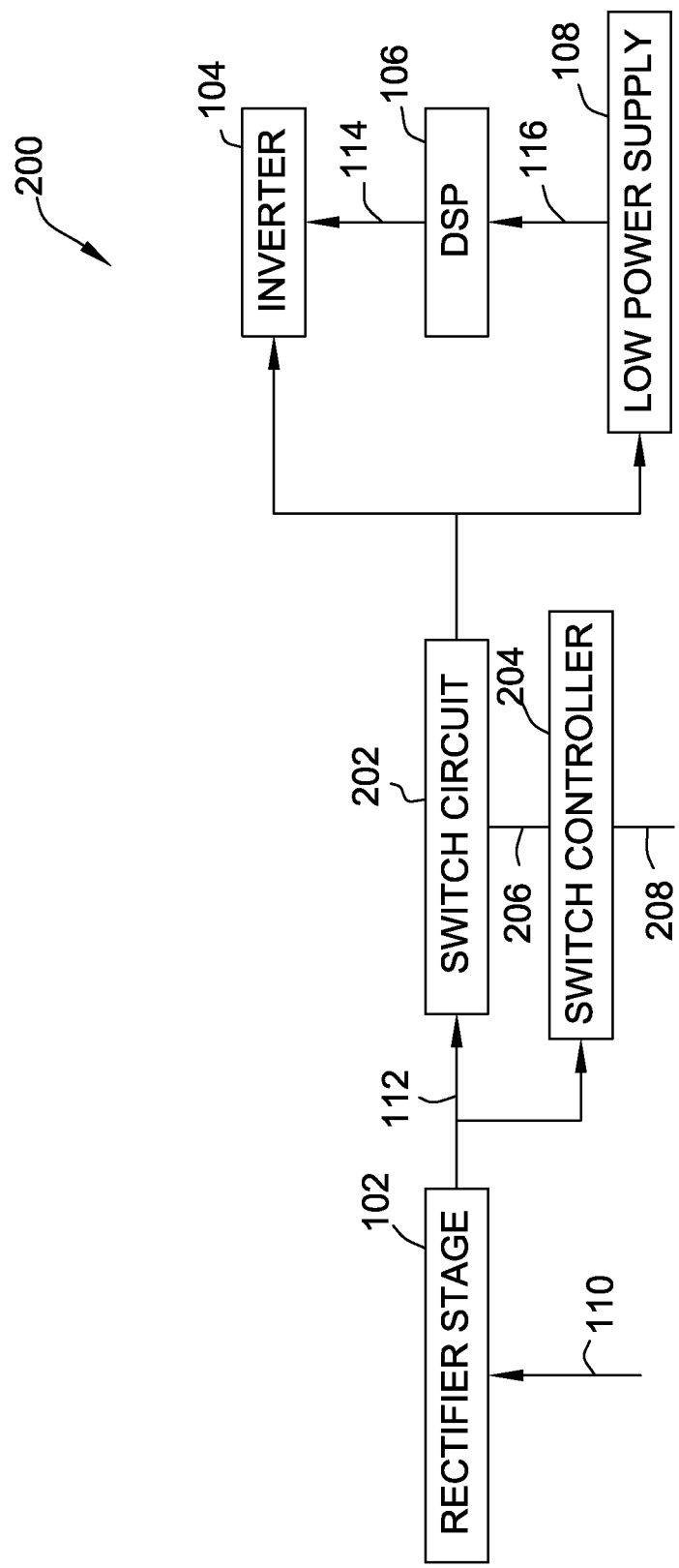
FIG. 2 is a block diagram of another exemplary motor controller.

FIG. 2 is a block diagram of an exemplary motor controller 200. Motor controller 200 includes rectifier stage 102, inverter 104, DSP 106, low-power supply 108, AC bus 110, and DC bus 112 (all shown in FIG. 1), a switch circuit 202, and a switch controller 204. Rectifier stage 102, inverter 104, DSP 106, and low-power supply 108 operate as described with respect to FIG. 1.

Switch circuit 202 includes one or more switches coupled between DC bus 112 and inverter 104 and low-power supply 108. Switch circuit 202 may include a switch such as an insulated-gate bipolar transistor (IGBT), metal-oxide-semiconductor field-effect transistor (MOSFET), bipolar junction transistor (BJT), or electromechanical relay. When switch circuit 202 is closed, inverter 104 and low-power supply 108 receive DC power from DC bus 112. When switch circuit 202 is open, inverter 104 and low-power supply 108 are electrically decoupled from DC bus 112, and inverter 104 and low-power supply 108 do not receive power. Switch circuit 202 is controlled by switch controller 204. Switch circuit 202 opens and closes according to a switch control signal 206 generated by switch controller 204. For example, when switch control signal 206 is a first logic signal, such as a logic-high signal, switch circuit 202 closes, connecting inverter 104 and low-power supply 108 to rectifier stage 102. When switch control signal 206 is a second logic signal, such as a logic-low signal, switch circuit 202 opens, electrically decoupling inverter 104 and low-power supply 108 from DC bus 112. In certain embodiments, switch circuit 202 controls inrush current to protect other components of motor controller 200 from high current levels that develop when switch circuit 202 closes.

Switch controller 204 generates switch control signal 206 in response to a system control signal 208. System control signal 208 is a signal that instructs motor controller 200, for example, to operate or enter a standby mode. System control signal 208 is generated by a system controller (not shown) that may be remote from motor controller 200. For example, system control signal 208 may be generated by a thermostat in a heating, ventilation, and air conditioning (HVAC) system or refrigeration system. The system controller may control motor controller 100 to operate in a plurality of different modes of operation and/or at a plurality of different speeds. System control signal 208 may be, for example, a 24 volt AC signal, a PWM signal, a serial communication signal, or any other signal suitable for communication within a system that includes motor controller 200. Switch controller 204 is coupled to rectifier stage 102 and is powered by DC bus 112.

When motor controller 200 enters standby mode, switch controller 204 controls switch circuit 202 to open, electrically decoupling inverter 104 and low-power supply 108 from DC bus 112. Accordingly, inverter 104, DSP 106, and low-power supply 108 do not consumer power while motor controller 200 is in standby mode, enabling motor controller 200 to have a lower standby power consumption rate.

Figure 3:
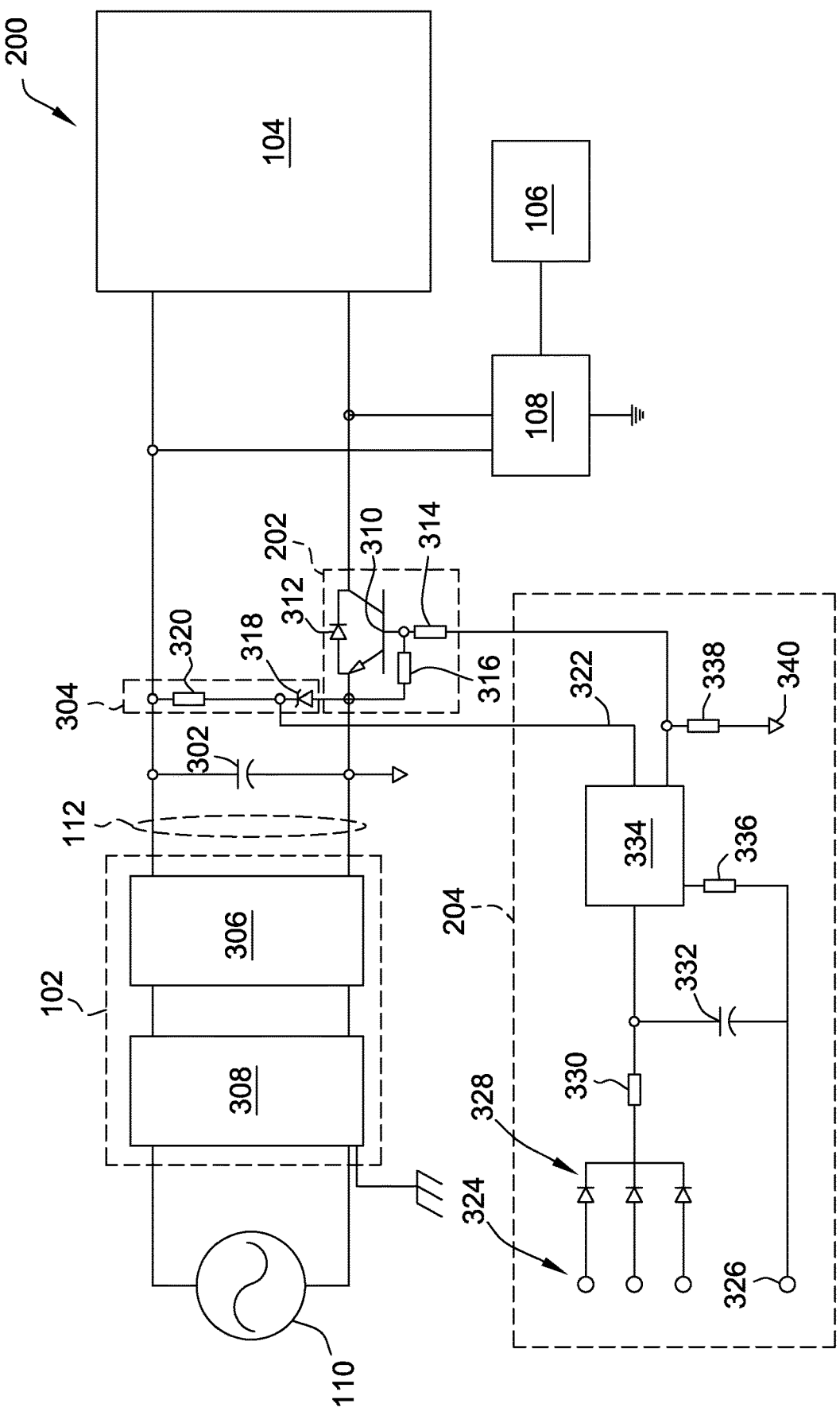
FIG. 3 is a schematic diagram of the exemplary motor controller shown in FIG. 2.

FIG. 3 is a schematic diagram of motor controller 200 shown in FIG. 2. Motor controller 200 includes, as illustrated in FIG. 3, a DC link 302 having a relatively large capacitor, and a power supply branch 304 in addition to the elements shown in FIGS. 1 and 2.

Rectifier stage 102 includes a rectifier 306 and a lightning protection circuit 308. Rectifier 306 converts an AC line signal to DC power on DC bus 112 that may be used to power the various components of motor controller 200. Lightning protection circuit 308 protects the various components of motor controller 200 from lightning and other transient high voltages, for example, by shorting when lightning or a transient high voltage is present.

Switch circuit 202 includes a transistor 310, a switch diode 312, a gate resistor 314, and a switch resistor 316. When a gate voltage is applied to transistor 310, transistor 310 closes.

Power supply branch 304 includes Zener diode 318 and resistor 320. Power supply branch 304 provides DC signal 322 to power switch controller 204.

Switch controller 204 includes system control connectors 324, common ground connector 326, system control signal diodes 328, a system control signal resistor 330, a system control signal capacitor 332, opto-coupler 334, input resistor 336, and output resistor 338. The system control connectors 324 and common ground connector 326 are configured to be coupled to a system controller (not shown) via control lines. System control signal diodes 328 are coupled to a respective one of system control connectors 324 and prevent backflow current into the control lines. System control signal resistor 330 and system control signal capacitor 332 filter high frequency signals at the input of Opto-coupler 334. Opto-coupler 334 detects the presence and/or absence of a voltage on any one of system control connectors 324 and isolates a control signal ground at common ground connector 326 from a motor controller ground 340, and protects the system controller coupled to system control connectors 324 from high voltages in motor controller 200. Opto-coupler 334 includes a light emitting diode (LED) that activates when a signal across the input terminals of opto-coupler has a voltage greater than a threshold. Input resistor 336 limits current through the LED when there is signal present across the input terminals of opto-coupler 334. Opto-coupler 334 includes two output terminals that are connected when the LED is activated. A first output terminal is coupled to power supply branch 304 and receives a DC signal 322. When activated, opto-coupler 334 closes and applies voltage to the gate of transistor 310. When deactivated, opto-coupler 334 opens and pulls the gate voltage of transistor 310 low.

Figure 4:
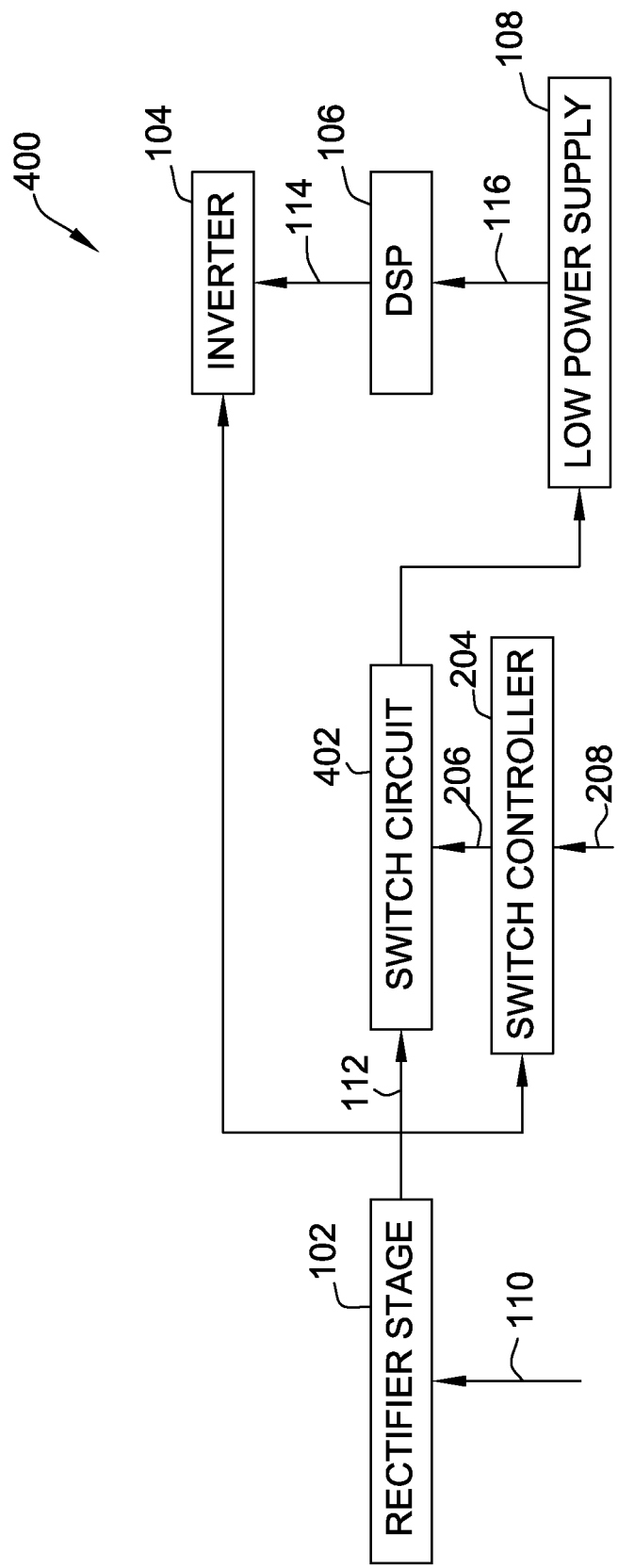
FIG. 4 is a block diagram of another exemplary motor controller.

FIG. 4 is a block diagram of an exemplary motor controller 400. Motor controller 400 includes rectifier stage 102, inverter 104, DSP 106, low-power supply 108, AC bus 110, DC bus 112 (all shown in FIG. 1), switch controller 204 (shown in FIG. 2) and switch circuit 402. Rectifier stage 102, inverter 104, DSP 106, and low-power supply 108 operate as described with respect to FIG. 1. Switch controller 204 operates as described with respect to FIG. 2.

Switch circuit 402 includes one or more switch devices coupled between DC bus 112 and low-power supply 108. Switch circuit 402 may, for example, anIGBT, a MOSFET, a BJT, or an electromechanical relay. When switch circuit 402 is closed, low-power supply 108 receives DC power from DC bus 112. When switch circuit 402 is open, low-power supply 108 is electrically decoupled from DC bus 112 and does not receive power. Switch circuit 402 is controlled by switch controller 204, as described above with respect to FIGS. 1-3. Switch circuit 402 opens and closes according to a switch control signal 206 generated by switch controller 404. For example, when switch control signal 206 is a first logic signal, such as a logic-high signal, switch circuit 402 closes, connecting low-power supply 108 to DC bus 112. When switch control signal 206 is a second logic signal, such as a logic-low signal, switch circuit 402 opens, electrically decoupling low-power supply 108 from DC bus 112. In certain embodiments, switch circuit 402 may control inrush current to protect other components of motor controller 400 from high current levels present at the moment switch circuit 402 closes.

When motor controller 400 enters standby mode, switch controller 204 controls switch circuit 402 to open, electrically decoupling low-power supply 108 from DC bus 112. DSP 106 and low-power supply 108 thus do not consume power while motor controller 400 is in standby mode, enabling motor controller 400 to have a lower standby power consumption rate.

Figure 5:
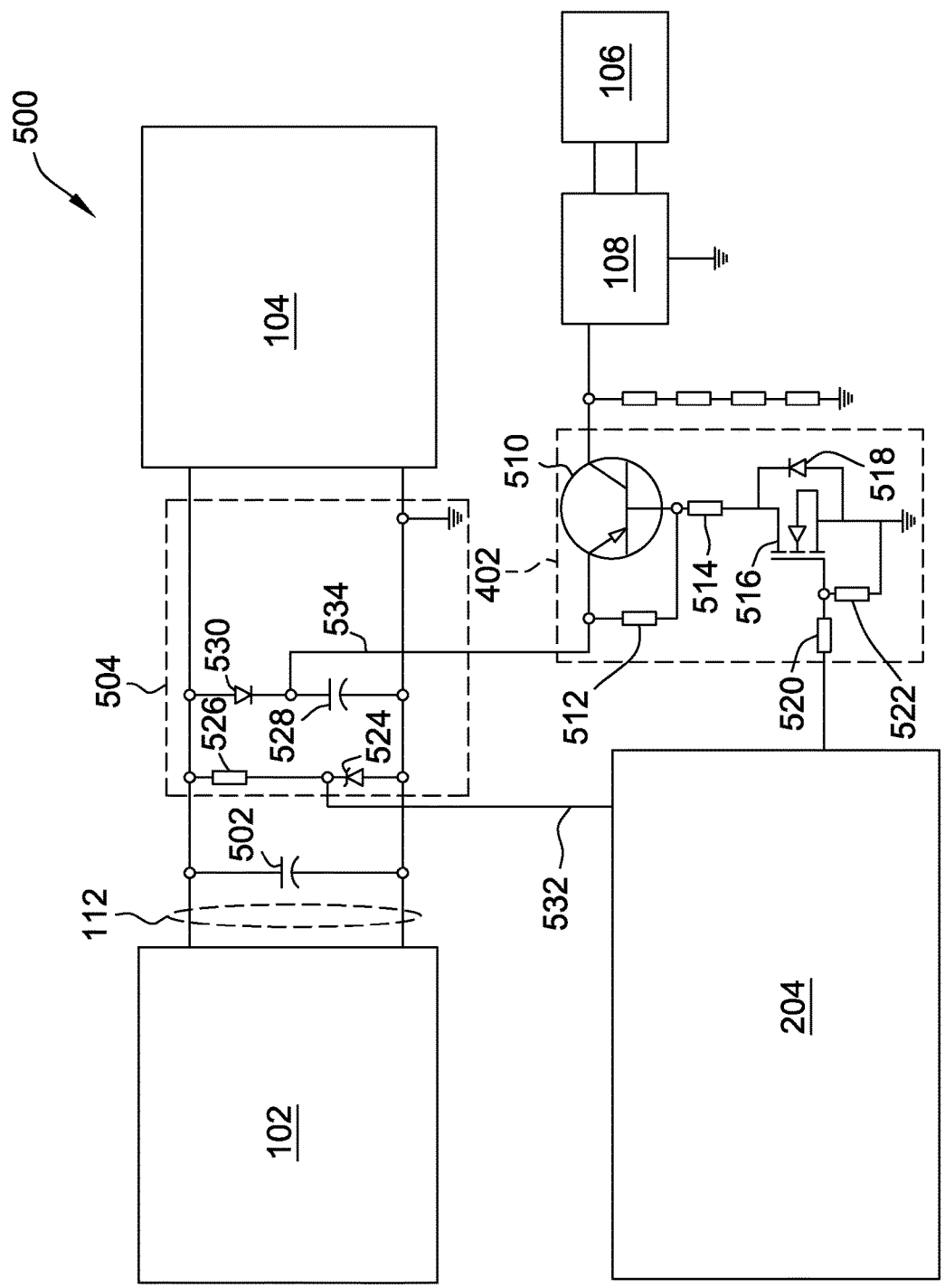
FIG. 5 is a schematic diagram of the exemplary motor controller shown in FIG. 4.

FIG. 5 is a schematic diagram of motor controller 400 shown in FIG. 4. Motor controller 400 includes a DC link 502 and a power supply branch 504 in addition to elements shown in FIGS. 2 and 4.

Switch circuit 402 includes a first transistor 510, a first gate resistor 512, a first gate resistor 514, a second transistor 516, a switch diode 518, a second gate resistor 520, and a second switch resistor 522. When a gate voltage is applied to second transistor 516, second transistor 516 closes. Consequently, the gate voltage of first transistor 510 is low, closing first transistor 510.

Power supply branch 504 includes Zener diode 524, a resistor 526, a capacitor 528, and a diode 530. Zener diode 524 and resistor 526 provide DC signal 532 to supply power to switch controller 204. Capacitor 528 and diode 530 provide DC signal 534 to supply power to low-power supply 108.

Figure 6:
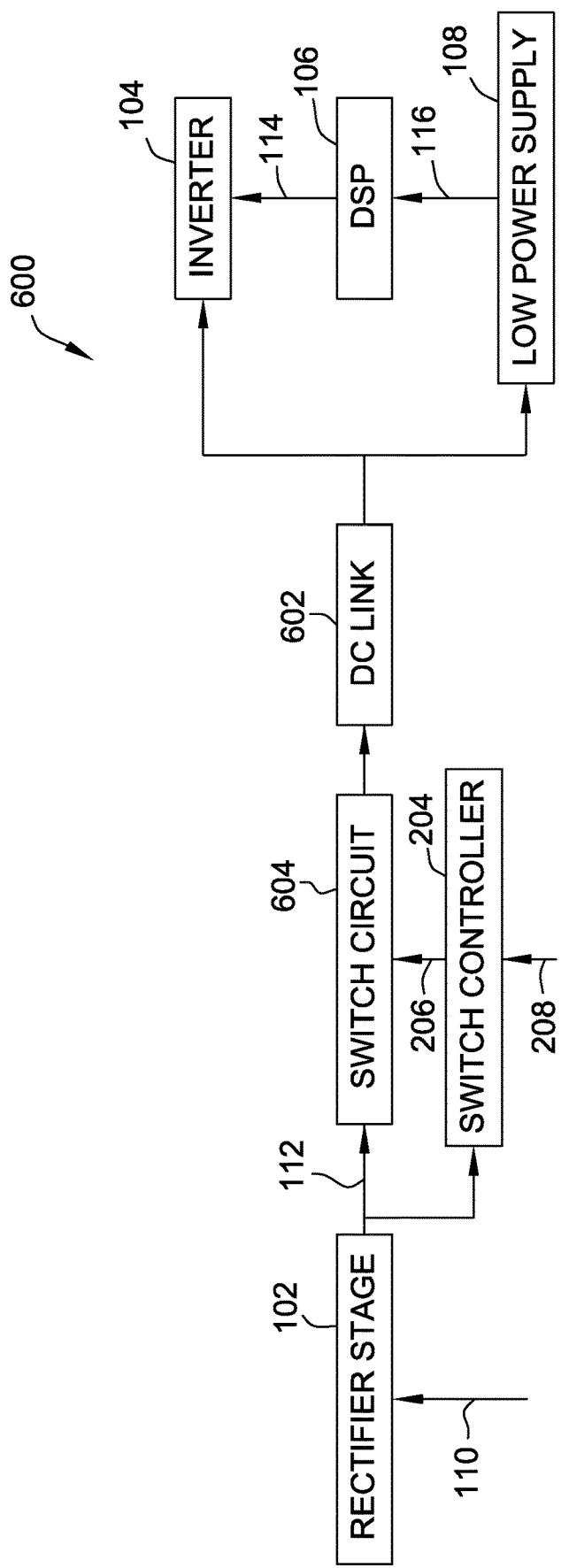
FIG. 6 is a block diagram of another exemplary motor controller.

FIG. 6 is a block diagram of an exemplary motor controller 600. Motor controller 600 includes rectifier stage 102, inverter 104, DSP 106, low-power supply 108, AC bus 110, DC bus 112 (all shown in FIG. 1), switch circuit 202 (shown in FIG. 2), a DC link 602, and a switch circuit 604. Rectifier stage 102, inverter 104, DSP 106, and low-power supply 108 operate as described with respect to FIG. 1. Switch controller 204 operates as described with respect to FIG. 2.

DC link 602, when connected to DC bus 112 filters ripple from a rectified signal to provide a DC signal to power inverter 104 and other components of motor controller 600. In the example embodiment of FIG. 6, DC link 602 is electrically decoupled from DC bus 112 while motor controller 600 is in standby mode.

Switch circuit 604 includes one or more switch devices coupled between DC bus 112 and inverter 104, low-power supply 108, and DC link 602. Switch circuit 604 may include, for example, an IGBT, a MOSFET, a BJT, or an electromechanical relay. When switch circuit 604 is closed, inverter 104 and low-power supply 108 are powered by DC bus 112. When switch circuit 604 is open, inverter 104 and low-power supply 108 are electrically decoupled from DC bus 112, and inverter 104 and low-power supply 108 do not receive power. Switch circuit 604 is controlled by switch controller 204. Switch circuit 604 opens and closes according to a switch control signal 206 generated by switch controller 204. For example, when switch control signal 206 is a first logic signal, such as a logic-high signal, switch circuit 604 closes, electrically coupling inverter 104 and low-power supply 108 to DC bus 112. When switch control signal 206 is a second logic signal, such as a logic-low signal, switch circuit 604 opens, electrically decoupling inverter 104, low-power supply 108, and DC link 602 from DC bus 112. In certain embodiments, switch circuit 604 may control inrush current to protect other components of motor controller 600 from high current levels that develop when switch circuit 604 closes.

When motor controller 600 enters standby mode, switch controller 204 controls switch circuit 604 to open, electrically decoupling inverter 104, low-power supply 108, and DC link 602 from DC bus 112. Accordingly, inverter 104, DSP 106, and low-power supply 108 do not consumer power while motor controller 600 is in standby mode, enabling motor controller 600 to have a lower standby power consumption rate.

Figure 7:
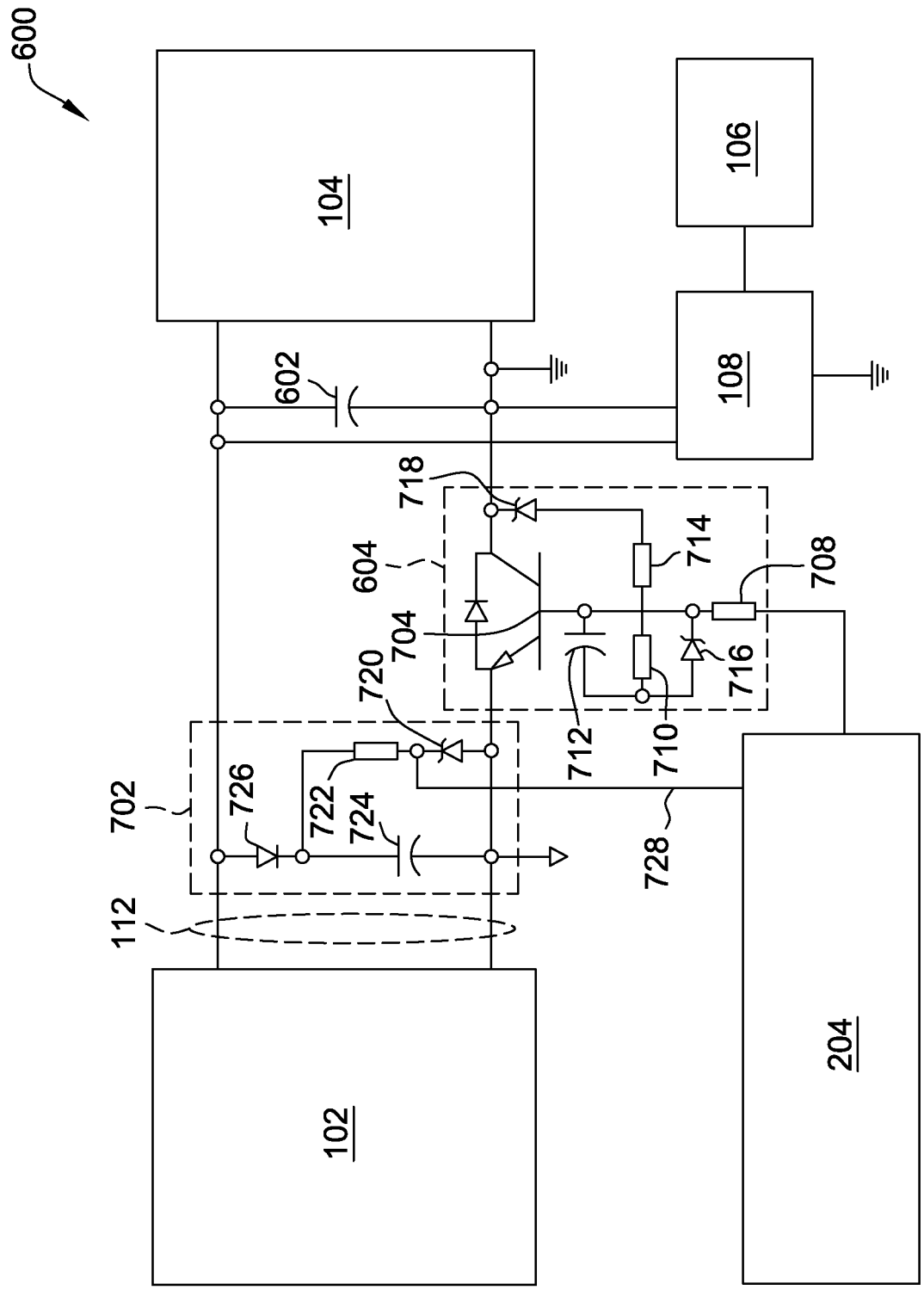
FIG. 7 is a schematic diagram of the exemplary motor controller shown in FIG. 6.

FIG. 7 is a schematic diagram of motor controller 600 shown in FIG. 6. Motor controller 600 includes a power supply branch 702 in addition to elements shown in FIGS. 2 and 6.

Switch circuit 604 includes a transistor 704, a switch diode 706, a gate resistor 708, a switch resistor 710, a switch capacitor 712, an inrush control resistor 714, a first switch Zener diode 716, and a second switch Zener diode 718. When a gate voltage is applied to transistor 704, transistor 704 closes. Gate resistor 708, switch resistor 710, and switch capacitor 712 limit inrush current through switch circuit 604 when transistor 704 closes.

Power supply branch 702 includes Zener diode 720, a resistor 722, a capacitor 724, and a diode 726. Power supply branch 702 provides a DC signal 728 to supply power to switch controller 204.

Figure 8:
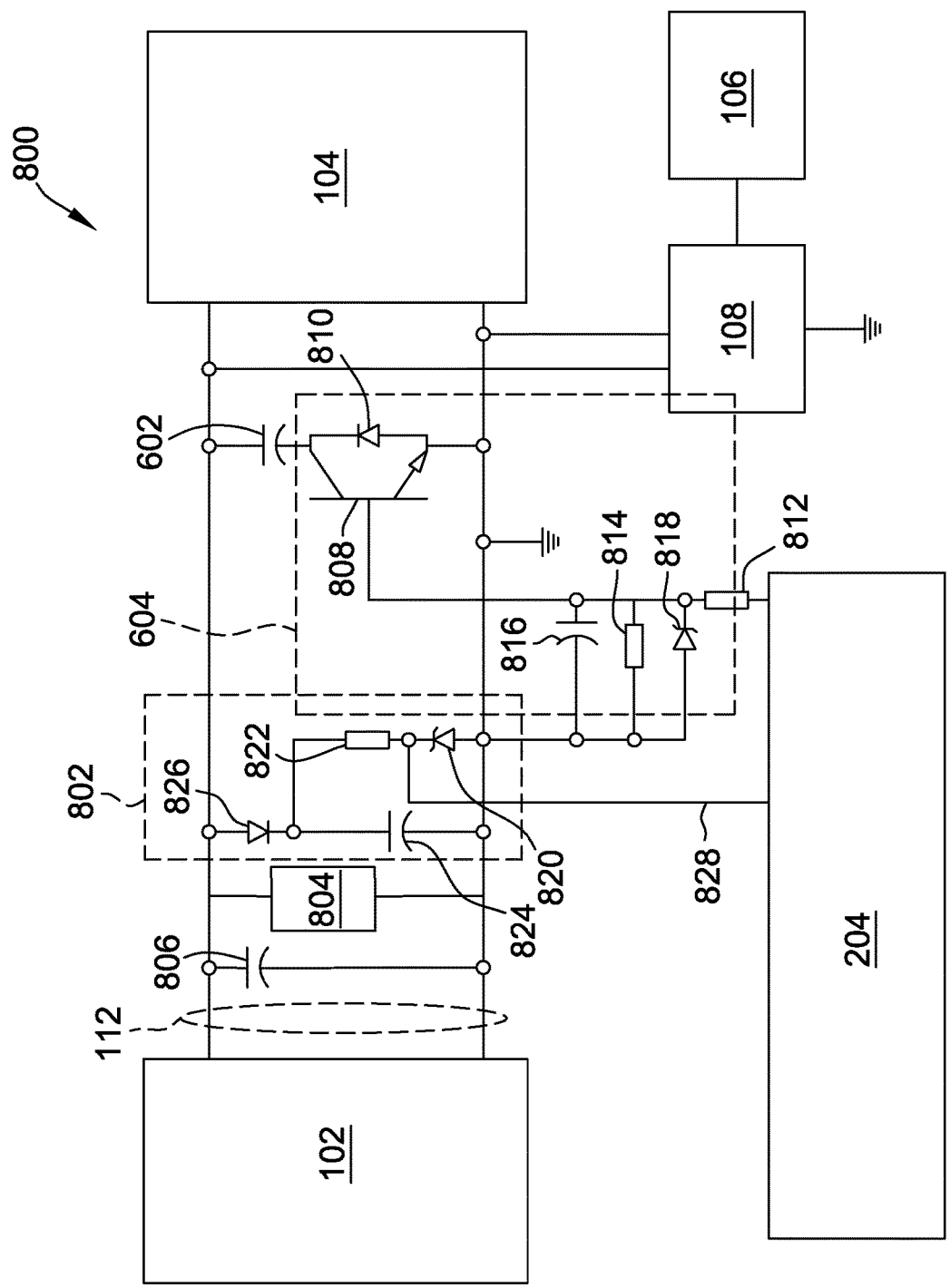
FIG. 8 is an alternative schematic diagram of the exemplary motor controller shown in FIG. 6.

FIG. 8 is an alternative schematic diagram of motor controller 600 shown in FIG. 6. Motor controller 600 includes a power supply branch 802, additional lightning protection circuit 804, and small capacitor 806 in addition to elements shown in FIGS. 2 and 6.

Switch circuit 604 includes a transistor 808, a switch diode 810, a gate resistor 812, a switch resistor 814, a switch capacitor 816, and a switch Zener diode 818. When a gate voltage is applied to transistor 808, transistor 808 closes. Additional lightning protection circuit 804 and small capacitor 806 protect switch circuit 604 during lightning strikes.

Power supply branch 802 includes Zener diode 820, a resistor 822, a capacitor 824, and a diode 826. Power supply branch 802 provides a DC signal 828 to supply power to switch controller 204.

Figure 9:
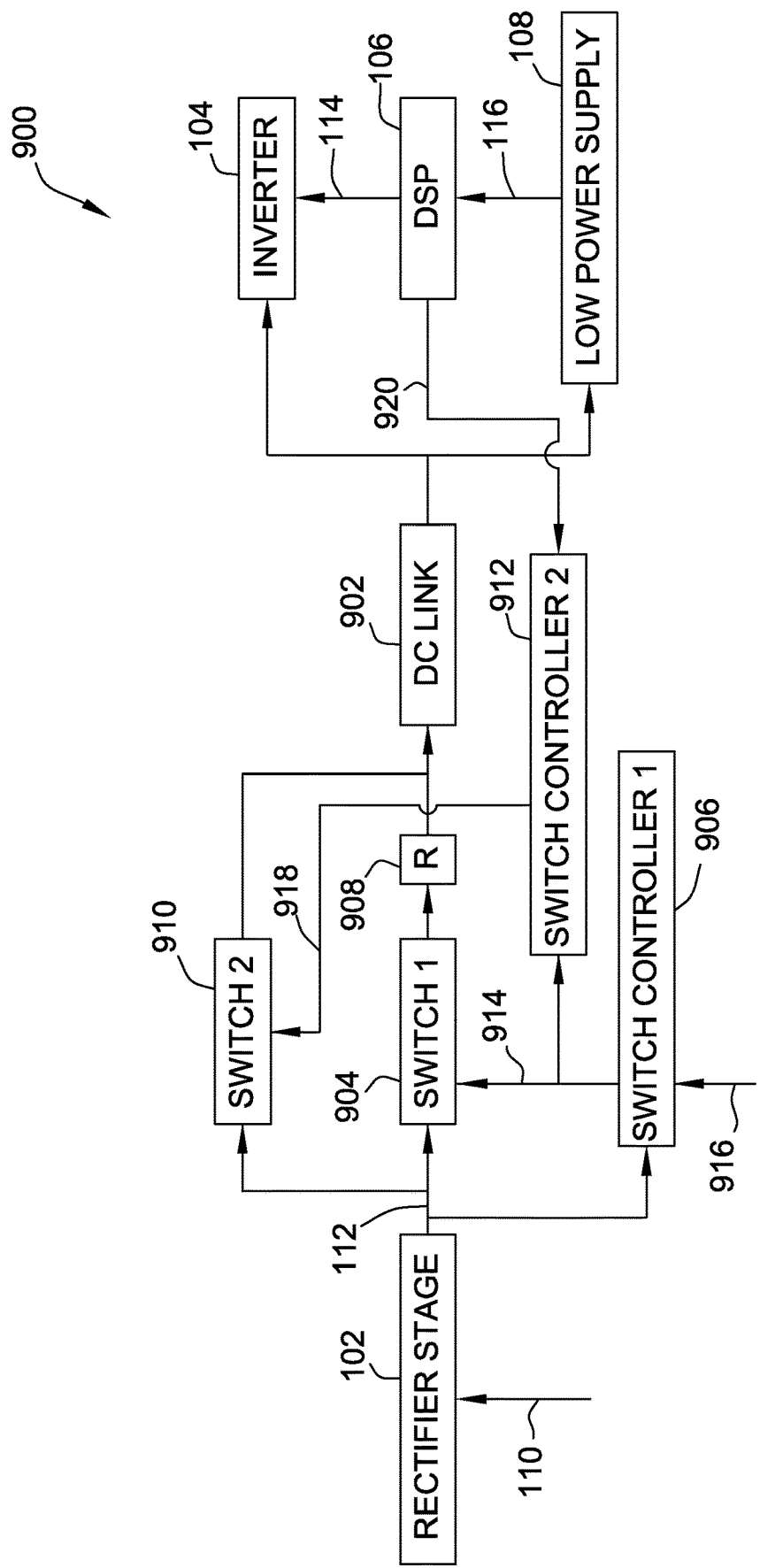
FIG. 9 is a block diagram of another exemplary motor controller.

FIG. 9 is a block diagram of an exemplary motor controller 900. Motor controller 900 includes a rectifier stage 102, inverter 104, DSP 106, low-power supply 108, AC bus 110, DC bus 112 (all shown in FIG. 1), and a DC link 902, a first switch circuit 904, a first switch controller 906, an inrush control resistor 908, a second switch circuit 910, and a second switch controller 912. Rectifier stage 102, inverter 104, DSP 106, and low-power supply 108 operate as described with respect to FIG. 1. Motor controller 900 includes two switch circuits to control inrush current, and to couple or decouple circuits in operating or standby mode, respectively.

First switch circuit 904 includes one or more switch devices coupled between DC bus 112 and inverter 104, low-power supply 108, and DC link 902 via inrush control resistor 908. First switch circuit 904 may include, for example, an IGBT, a MOSFET, a BJT, or an electromechanical relay. Inrush control resistor 908 limits inrush current at the moment first switch circuit 904 closes, protecting components of motor controller 900 from high current. First switch circuit 904 is controlled by first switch controller 906. First switch circuit 904 opens and closes according to a first switch control signal 914 generated by first switch controller 906. For example, when first switch control signal 914 is a first logic signal, such as a logic-high signal, first switch circuit 904 closes, connecting inverter 104, low-power supply 108, and DC link 902 to DC bus 112 via inrush control resistor 908. When first switch control signal 914 is a second logic signal, such as a logic-low signal, first switch circuit 904 opens, electrically decoupling inverter 104, low-power supply 108, and DC link 902 from DC bus 112.

First switch controller 906 generates first switch control signal 914 in response to system control signal 916. System control signal 916 is a signal that instructs motor controller 900, for example, to operate or enter a standby mode. System control signal 916 may be generated, for example, by a thermostat in a HVAC system or refrigeration system. System control signal 916 may be, for example, a 24 volt AC signal, a PWM signal, a serial communication signal, or any other signal suitable for communication within a system that includes motor controller 900. First switch controller 906 is powered by DC bus 112.

Second switch circuit 910 includes one or more switch devices coupled between DC bus 112 and inverter 104, low-power supply 108, and DC link 902. When second switch circuit 910 is closed, inverter 104 and low-power supply 108 are electrically coupled directly to DC bus 112. Second switch circuit 910 may be closed after first switch circuit 904 is closed and the system has reached a steady state with no inrush current present. Second switch circuit 910 may include, for example, an IGBT, a MOSFET, a BJT, or an electromechanical relay, and is controlled by a second switch control signal 918.

Second switch controller 912 receives a signal 920 from DSP 106 when DSP 106 receives power. When second switch controller 912 receives signal 920, second switch controller 912 generates a second switch control signal 918 to close second switch circuit 910. Second switch controller 912 is powered by first switch control signal 914, thus, when first switch controller 906 no longer a receives system control signal 916 for motor controller 900 to operate, second switch control signal 918 opens second switch circuit 910, electrically decoupling inverter 104 low-power supply 108, and DC link 902 from DC bus 112.

Figure 10:
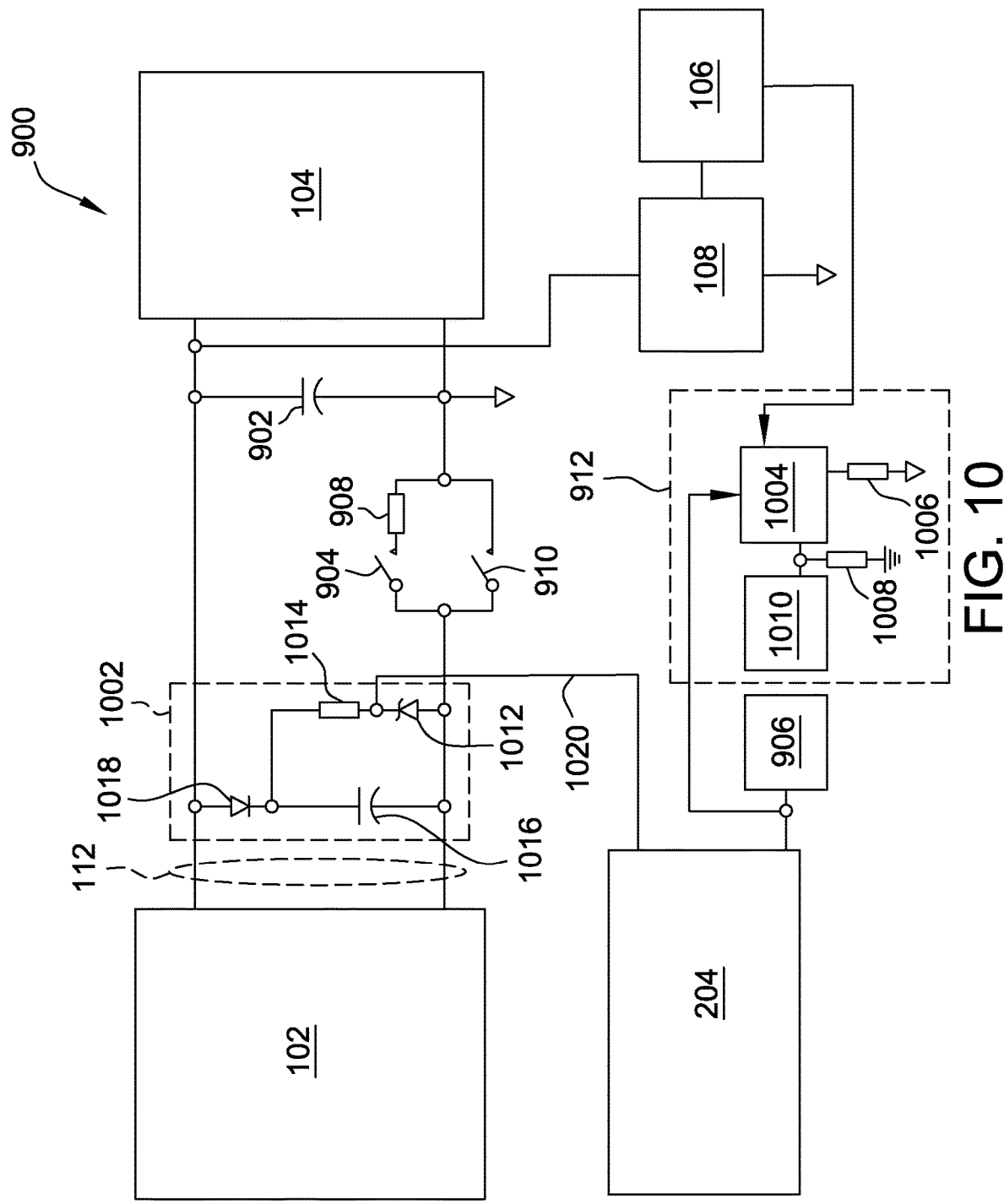
FIG. 10 is a schematic diagram of the exemplary motor controller shown in FIG. 9.

FIG. 10 is a schematic diagram of motor controller 900 shown in FIG. 9. Motor controller 900 includes a power supply branch 1002 in addition to elements shown in FIGS. 2 and 9. First switch controller 906 operates in a similar manner as switch controller 204 (described with respect to FIGS. 2 and 3).

Second switch controller 912 includes an opto-coupler 1004, input resistor 1006, output resistor 1008, and gate drive circuit 1010 of second switch circuit 910. Opto-coupler 1004 detects signal 920. When activated, opto-coupler 1004 closes and applies a logic-high signal to gate drive circuit 1010. When deactivated, opto-coupler 1004 opens and applies a logic-low signal to gate drive circuit 1010.

Power supply branch 1002 includes power supply Zener diode 1012, power supply resistor 1014, power supply capacitor 1016, and power supply diode 1018. Power supply branch 1002 provides a DC signal 1020 to supply power to switch controller 906.

Figure 11:
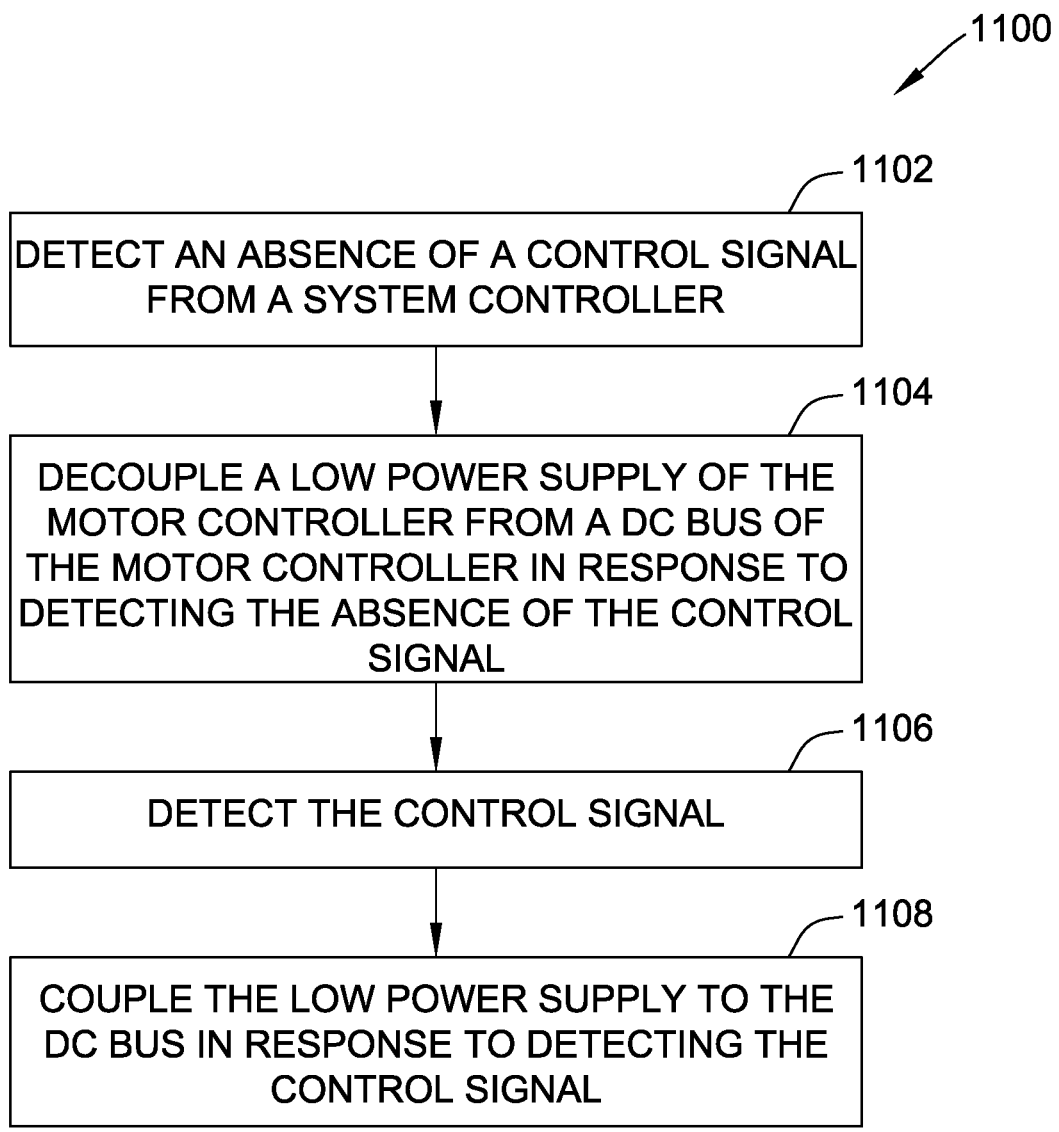
FIG. 11 is a flowchart illustrating an exemplary method of operating a motor controller.

FIG. 11 is a flowchart illustrating an exemplary method 1100 of operating an electric motor using a motor controller such as motor controller 100 (shown in FIG. 2). Motor controller 100 detects 1102 the absence of a control signal from a system controller. In certain embodiments, motor controller 100 includes a switch controller, such as switch controller 204 shown in FIG. 2, that detects the absence of the control signal.

Motor controller 100 decouples 1104 low-power supply 108 from DC bus 112 of motor controller 100 in response to detecting 1102 the absence of the control signal. In certain embodiments, motor controller 100 includes a switch circuit, such as switch circuit 202 shown in FIG. 2, that is coupled between low-power supply 108 and DC bus 112 and decouples low-power supply 108 from DC bus 112 in response to switch controller 204 detecting the absence of the control signal.

Motor controller 100 detects 1106 the control signal from the system controller. For example, switch controller 204 shown in FIG. 2 detects the presence of the control signal.

Motor controller 100 couples 1108 low-power supply 108 to the DC bus in response to detecting the control signal from the system controller. For example, switch circuit 202 shown in FIG. 2 couples low-power supply 108 to DC bus 112 in response to switch controller 204 detecting the presence of the control signal.

In some embodiments, motor controller 100 receives a command from the system controller to operate in one of a plurality of modes. In certain embodiments, motor controller 100 receives a command from the system controller to operate at a speed.

In some embodiments, motor controller 100 decouples inverter 104 from DC bus 112 of motor controller 100 in response to detecting 1102 the absence of the control signal. For example, switch circuit 202 shown in FIG. 2 decouples inverter 104 from DC bus 112 in response to switch controller 204 detecting the absence of the control signal. In such embodiments, motor controller 100 couples inverter 104 to DC bus 112 in response to detecting the presence of the signal from the system controller. For example, switch circuit 202 couples inverter 104 to DC bus 112 in response to switch controller 204 detecting the presence of the control signal.

In certain embodiments, motor controller 100 decouples a DC link such as DC link 602 shown in FIG. 6 from DC bus 112 of motor controller 100 in response to detecting 1102 the absence of the control signal. For example, switch circuit 604 shown in FIG. 6 decouples DC link 602 from DC bus 112 in response to switch controller 204 detecting the absence of the control signal. In such embodiments, motor controller 100 couples the DC link to DC bus 112 in response to detecting the presence of the signal from the system controller. For example, switch circuit 604 couples DC link 602 to DC bus 112 in response to switch controller 204 detecting the presence of the control signal.

Technical effects of the motor controller described herein include (a) detecting an absence of a system control signal to determine when a motor controller is in standby mode; (b) decoupling a low-power supply of a motor controller from a DC bus of the motor controller when in standby mode; (c) decoupling an inverter from a DC bus of the motor controller when in standby mode; (d) decoupling a DSP from the DC bus of the motor controller when in standby mode; (e) decoupling a DC link from the DC bus of the motor controller when in standby mode; (f) detecting a presence of the system control signal to determine when a motor controller is operating the electric motor; (g) coupling the low-power supply to the DC bus when operating the electric motor; (h) reducing standby power consumption by decoupling components from the DC bus during a standby mode such that the electrically decoupled components are not powered and do not consume power during the standby mode; and (i) extending the service life of components by electrically decoupling components during standby mode to limit the amount of time the components are subject to voltage stress.

Some embodiments involve the use of one or more electronic processing or computing devices. As used herein, the terms "processor" and "computer" and related terms, e.g., "processing device," "computing device," and "controller" are not limited to just those integrated circuits referred to in the art as a computer, but broadly refers to a processor, a processing device, a controller, a general purpose central processing unit (CPU), a graphics processing unit (GPU), a microcontroller, a microcomputer, a programmable logic controller (PLC), a reduced instruction set computer (RISC) processor, a field programmable gate array (FPGA), a digital signal processing (DSP) device, an application specific integrated circuit (ASIC), and other programmable circuits or processing devices capable of executing the functions described herein, and these terms are used interchangeably herein. The above embodiments are examples only, and thus are not intended to limit in any way the definition or meaning of the terms processor, processing device, and related terms.

In the embodiments described herein, memory may include, but is not limited to, a non-transitory computer-readable medium, such as flash memory, a random access memory (RAM), read-only memory (ROM), erasable programmable read-only memory (EPROM), electrically erasable programmable read-only memory (EEPROM), and non-volatile RAM (NVRAM). As used herein, the term "non-transitory computer-readable media" is intended to be representative of any tangible, computer-readable media, including, without limitation, non-transitory computer storage devices, including, without limitation, volatile and non-volatile media, and removable and non-removable media such as a firmware, physical and virtual storage, CD-ROMs, DVDs, and any other digital source such as a network or the Internet, as well as yet to be developed digital means, with the sole exception being a transitory, propagating signal. Alternatively, a floppy disk, a compact disc-read only memory (CD-ROM), a magneto-optical disk (MOD), a digital versatile disc (DVD), or any other computer-based device implemented in any method or technology for short-term and long-term storage of information, such as, computer-readable instructions, data structures, program modules and sub-modules, or other data may also be used. Therefore, the methods described herein may be encoded as executable instructions, e.g., "software" and "firmware," embodied in a non-transitory computer-readable medium. Further, as used herein, the terms "software" and "firmware" are interchangeable, and include any computer program stored in memory for execution by personal computers, workstations, clients and servers. Such instructions, when executed by a processor, cause the processor to perform at least a portion of the methods described herein.

Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A motor controller comprising:
   a direct current (DC) bus;
   a low-power supply;
   an inverter configured to control a supply of current to stator windings of a motor, wherein said DC bus is configured to supply power to said inverter;
   a switch circuit coupled between said DC bus and said low-power supply and coupled between said DC bus and said inverter; and
   a switch controller coupled to said switch circuit and said DC bus and configured to be coupled to a system controller, said switch controller configured to control said switch circuit to electrically decouple, in response to detecting an absence of a control signal from the system controller, said DC bus from said inverter and said low-power supply to prevent a supply of power to said inverter and said low-power supply, wherein said switch controller is further configured to be powered by said DC bus and remain powered when said inverter and said low-power supply are electrically decoupled from said DC bus.

2. The motor controller of claim 1, wherein said motor controller is remote from the system controller.

3. The motor controller of claim 1, wherein the system controller is configured to control the motor to operate in a plurality of modes of operation.

4. The motor controller of claim 1, wherein the system controller is configured to control the motor to operate at a plurality of speeds.

5. The motor controller of claim 1, further comprising a DC link.

6. The motor controller of claim 5, wherein said switch circuit is further coupled between said DC bus and said DC link, and said switch controller is further configured to control said switch circuit to electrically decouple, in response to detecting an absence of a control signal from the system controller, said DC bus from said DC link.

7. The motor controller of claim 1, wherein said switch circuit is configured to limit inrush current.

8. A method for operating a motor controller, said method comprising:
   detecting, by a switch controller configured to be powered by a DC bus, an absence of a control signal from a system controller;
   decoupling, by a switch circuit, a low-power supply and an inverter of the motor controller from the DC bus of the motor controller in response to detecting the absence of the control signal to prevent a supply of power to the inverter and the low-power supply, wherein the DC bus is configured to supply power to the low-power supply and the inverter, and wherein the switch controller remains powered when said inverter and said low-power supply are electrically decoupled from said DC bus;
   detecting, by the switch controller, the control signal; and
   coupling, by the switch circuit, the low-power supply and the inverter to the DC bus in response to detecting the control signal.

9. The method of claim 8, further comprising receiving a command from the system controller to operate in one of a plurality of modes.

10. The method of claim 8, further comprising receiving a command from the system controller to operate at a speed.

11. The method of claim 8, further comprising:
decoupling, by the switch circuit, a DC link from the DC bus of the motor controller in response to detecting the absence of the control signal; and
coupling, by the switch circuit, the DC link to the DC bus in response to detecting the control signal.

12. A motor comprising:
a plurality of stator windings; and
a motor controller comprising a DC bus, a switch controller, a switch circuit, an inverter, and a low-power supply, said low-power supply configured to power control electronics of the motor, said inverter configured to control a supply of current to said plurality of stator windings, said DC bus configured to supply power to said low-power supply, said switch controller, and said inverter, said switch controller configured to control said switch circuit to electrically decouple said DC bus from said low-power supply and said inverter to prevent a supply of power to said low-power supply and said inverter in response to detecting an absence of a control signal from a system controller, wherein said switch controller is further configured to be powered by said DC bus and remain powered when said inverter and said low-power supply are electrically decoupled from said DC bus.

13. The motor of claim 12, wherein said motor is remote from the system controller.

14. The motor of claim 12, wherein the system controller is configured to control said motor to operate in a plurality of modes of operation.

15. The motor of claim 12, wherein the system controller is configured to control said motor to operate at a plurality of speeds.

16. The motor of claim 12, wherein said motor controller further comprises a DC link, and said motor controller is further configured to electrically decouple said DC link from said DC bus in response to detecting an absence of the control signal from the system controller.

17. The motor of claim 12, wherein said motor controller is configured to limit inrush current.

\* \* \* \* \*